United States Patent
Ohara

(10) Patent No.: US 11,091,116 B2
(45) Date of Patent: Aug. 17, 2021

(54) AIRBAG DEVICE

(71) Applicant: Toyota Jidosha Kabushiki Kaisha, Toyota (JP)

(72) Inventor: Koji Ohara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/671,687

(22) Filed: Nov. 1, 2019

(65) Prior Publication Data

US 2020/0180544 A1    Jun. 11, 2020

(30) Foreign Application Priority Data

Dec. 10, 2018 (JP) .............................. JP2018-231159

(51) Int. Cl.
*B60R 21/232* (2011.01)
*E05C 17/02* (2006.01)
(Continued)

(52) U.S. Cl.
CPC .......... *B60R 21/232* (2013.01); *B60R 21/205* (2013.01); *B60R 21/21* (2013.01); *B60R 21/215* (2013.01); *B60R 21/264* (2013.01); *E05C 17/02* (2013.01); *B60R 21/2165* (2013.01); *B60R 2021/0009* (2013.01); *B60R 2021/0023* (2013.01); *B60R 2021/21537* (2013.01); *B60R 2021/23107* (2013.01)

(58) Field of Classification Search
CPC ..... B60R 21/232; B60R 21/205; B60R 21/21; B60R 21/215; B60R 21/264; B60R 2021/21537; B60R 2021/23107; B60R 2021/0009; B60R 21/231; E05C 17/02
USPC ......................................................... 280/732
See application file for complete search history.

(56) References Cited

U.S. PATENT DOCUMENTS 4,852,907 A * 8/1989 Shiraki ............. B60R 21/21656
                                                  280/731
5,372,379 A * 12/1994 Parker ................... B60R 21/216
                                                   165/41
(Continued)

FOREIGN PATENT DOCUMENTS

JP      H08324373     12/1996
JP      2016-040155 A  3/2016
(Continued)

*Primary Examiner* — Paul N Dickson
*Assistant Examiner* — Daniel M. Keck
(74) *Attorney, Agent, or Firm* — Dinsmore & Shohl LLP

(57) ABSTRACT

An airbag device includes a curtain airbag deployed to a vehicle width direction outer side of an occupant seated in a vehicle seat; a front airbag provided at a front side of the vehicle seat, which is deployed to a vehicle front side of the occupant; an airbag housing, provided at the front side of the vehicle seat, in which the front airbag is housed before inflating; and an airbag door that covers the airbag housing from a cabin side and that is displaced toward a cabin side, in a case in which the front airbag inflates such that the cabin side of the airbag housing is opened. The airbag door includes plural door portions and the airbag device is provided with a limiting member that restricts tilting of a door portion that tilts about a hinge portion disposed at a vehicle width direction inner side of the airbag housing.

8 Claims, 7 Drawing Sheets

(51) Int. Cl.
  *B60R 21/205* (2011.01)
  *B60R 21/21* (2011.01)
  *B60R 21/215* (2011.01)
  *B60R 21/264* (2006.01)
  *B60R 21/00* (2006.01)
  *B60R 21/2165* (2011.01)
  *B60R 21/231* (2011.01)

(56) References Cited

U.S. PATENT DOCUMENTS

| | | | | |
|---|---|---|---|---|
| 5,470,097 | A * | 11/1995 | Elqadah | B60R 21/21656 280/728.3 |
| 6,082,760 | A * | 7/2000 | Ukai | B60R 21/2165 280/728.1 |
| 6,692,017 | B2 * | 2/2004 | Taoka | B60R 21/201 280/728.2 |
| 8,276,939 | B2 * | 10/2012 | Kuhne | B60R 21/239 280/739 |
| 8,540,277 | B2 * | 9/2013 | Miyata | B60R 21/239 280/739 |
| 8,814,207 | B2 * | 8/2014 | Matsumoto | B60R 21/2165 280/732 |
| 9,010,800 | B1 * | 4/2015 | Hunter | B29C 66/112 280/728.3 |
| 9,045,107 | B2 * | 6/2015 | Kim | B60R 21/2165 |
| 9,193,323 | B2 * | 11/2015 | Schupbach | B60R 21/215 |
| 10,864,882 | B2 * | 12/2020 | Obayashi | B60R 21/2334 |
| 2005/0067819 | A1 * | 3/2005 | Segura | B60R 21/2155 280/732 |
| 2006/0267313 | A1 * | 11/2006 | Yasuda | B60R 21/2165 280/728.3 |
| 2012/0217729 | A1 * | 8/2012 | Horibe | B60R 21/2165 280/728.3 |
| 2016/0046257 | A1 | 2/2016 | Yamada et al. | |
| 2017/0158154 | A1 | 6/2017 | Kobayashi et al. | |
| 2017/0355346 | A1 | 12/2017 | Kobayashi | |
| 2018/0354446 | A1 * | 12/2018 | Slaats | B60R 21/205 |
| 2021/0024025 | A1 * | 1/2021 | Vos | B60R 21/2165 |
| 2021/0107424 | A1 * | 4/2021 | Takai | B60R 21/2165 |

FOREIGN PATENT DOCUMENTS

| | | |
|---|---|---|
| JP | 2017-100685 | 6/2017 |
| JP | 2017-222185 A | 12/2017 |
| JP | 2017-226395 A | 12/2017 |
| JP | 2018-024341 A | 2/2018 |

\* cited by examiner

FIG.7
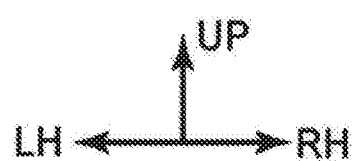
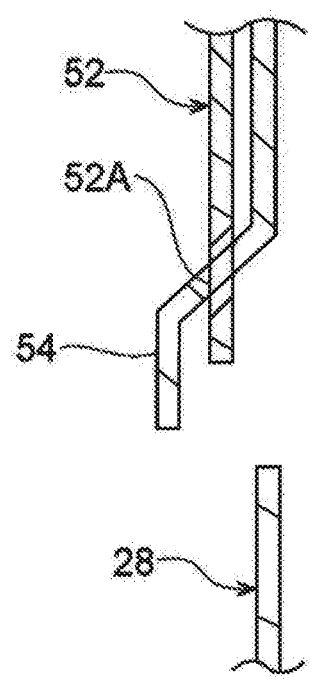

AIRBAG DEVICE

CROSS-REFERENCE TO RELATED APPLICATION

This application claims priority under 35 USC 119 from Japanese Patent Application No. 2018-231159, filed on Dec. 10, 2018, the disclosure of which is incorporated by reference herein in its entirety.

BACKGROUND

Technical Field

The present disclosure relates to an airbag device.

Related Art

Japanese Patent Application Laid-open (JP-A) No. 2017-222185 discloses an airbag device including a main bag portion, which is deployed to a seat front side of an occupant seated in a vehicle seat, and a center bag portion, which projects rearward from a vehicle width direction inner side of the main bag portion. In the airbag device described in this document, when the vehicle sustains an oblique impact on a driver's seat side, the head of the occupant that moves in a vehicle forward direction and inward in a vehicle width direction becomes disposed in a slit formed between the main bag portion and the center bag portion, whereby the rotational injury criterion of the head of the occupant can be reduced.

Furthermore, JP-A No. H08-324373 discloses an airbag device including an airbag, which is deployed to a seat front side of an occupant seated in a vehicle seat, and a pair of projecting portions, which project rearward from both vehicle width direction side portions of the airbag. In the airbag device described in this document, when the vehicle sustains an oblique impact, a head of the occupant that moves in a vehicle forward direction and inward in a vehicle width direction comes into abutting contact with the projecting portions, whereby the head of the occupant can be restrained.

SUMMARY

In a configuration including a curtain airbag that is deployed at a vehicle width direction outer side of an occupant seated in a vehicle seat, when the curtain airbag that has deployed and an airbag that has deployed to a front side of the occupant come into abutting contact with each other, it is conceivable for the airbag that has deployed to the front side of the occupant to be displaced inward in a vehicle width direction, but the configurations described in JP-A No. 2017-222185 and JP-A No. H08-324373 do not take such a case into account.

In consideration of the above circumstances, the present disclosure obtains an airbag device that can inhibit displacement, inward in the vehicle width direction, of an airbag that has come into abutting contact with a curtain airbag.

An airbag device of a first aspect of the disclosure includes a curtain airbag that is inflated by gas supplied to an inside of the curtain airbag, and that is configured to be deployed to a vehicle width direction outer side of an occupant seated in a vehicle seat; a front airbag provided at a vehicle front side of the vehicle seat, the front airbag is inflated by gas supplied to an inside of the front airbag, and the front airbag is configured to be deployed to a vehicle front side of the occupant seated in the vehicle seat; an airbag housing, provided at the vehicle front side of the vehicle seat, in which the front airbag is housed before inflating; and an airbag door that covers the airbag housing from a cabin side and that is displaced toward the cabin side, in a case in which the front airbag inflates such that the cabin side of the airbag housing is opened. The airbag door includes plural door portions that tilt about hinge portions disposed at an airbag housing side, and the airbag device is provided with a limiting member that restricts tilting of a door portion that tilts about a hinge portion that is disposed at a vehicle width direction inner side of the airbag housing.

According to the airbag device of the first aspect, the curtain airbag is inflated by gas and the curtain airbag is configured to be deployed to the vehicle width direction outer side of the occupant seated in the vehicle seat.

Furthermore, when the front airbag is inflated by gas, the airbag door is displaced toward the cabin side. The cabin side of the airbag housing is opened and the front airbag deploys from the airbag housing to the vehicle front side of the occupant seated in the vehicle seat.

When the curtain airbag and the front airbag come into abutting contact with each other, it is conceivable for the front airbag to be displaced inward in the vehicle width direction. However, in the airbag device of the first aspect, tilting of the door portion, which tilts about the hinge portion disposed at the vehicle width direction inner side of the airbag housing, is restricted by the limiting member. Displacement of the front airbag inward in the vehicle width direction can be regulated by the door portion whose tilting is restricted by the limiting member. Displacement, inward in the vehicle width direction, of the front airbag that has come into abutting contact with the curtain airbag can be inhibited.

An airbag device of a second aspect of the disclosure is the airbag device of the first aspect, wherein a size of the door portion whose tilting is limited by the limiting member is larger than a size of a door portion that tilts about a hinge portion on a vehicle width direction outer side of the airbag housing.

According to the airbag device of the second aspect, the size of the door portion whose tilting is limited by the limiting member is set as described above, thus, the contact area between the door portion whose tilting is limited by the limiting member and the front airbag can be increased. Because of this, displacement, inward in the vehicle width direction, of the front airbag that has come into abutting contact with the curtain airbag can be effectively inhibited.

An airbag device of a third aspect of the disclosure is the airbag device of the first aspect or the second aspect, wherein the front airbag includes a center portion that is disposed opposing, in a seat front and rear direction, the occupant seated in the vehicle seat, and projecting portions that project in a seat rearward direction from both end portions in the vehicle width direction of the center portion.

In a configuration where the front airbag includes the projecting portions, it is easy for the projecting portion at a vehicle width direction outer side to come into abutting contact with the curtain airbag. However, in the airbag device of the third aspect, when the projecting portion at the vehicle width direction outer side of the front airbag comes into abutting contact with the curtain airbag, displacement of the front airbag inward in the vehicle width direction can be regulated by the door portion whose tilting is limited by the limiting member.

An airbag device of a fourth aspect of the disclosure is the airbag device of any of the first aspect to the third aspect, wherein the front airbag is symmetrical in the vehicle width direction.

In a case where the front airbag is not symmetrical in the vehicle width direction by eliminating the projecting portion at the vehicle width direction outer side of the front airbag so as to avoid abutment with the curtain airbag, it is easy for the front airbag to swing in the vehicle width direction when the front airbag inflates. However, according to the airbag device of the fourth aspect, since the front airbag is symmetrical in the vehicle width direction, the front airbag can be inhibited from swinging in the vehicle width direction when the front airbag inflates.

An airbag device of a fifth aspect of the disclosure is the airbag device of any of the first aspect to the fourth aspect, wherein at least a part of the limiting member is contained in the door portion.

According to the airbag device of the fifth aspect, at least a part of the limiting member is contained in the door portion, the configuration of the portion of the limiting member that is secured to the door portion can be inhibited from becoming complex.

An airbag device of a sixth aspect of the disclosure is the airbag device of any of the first aspect to the fifth aspect, wherein the airbag door includes a frame-shaped projecting plate portion that projects to the airbag housing side from the hinge portions of the door portions, and the projecting plate portion is disposed at an outer peripheral side of the airbag housing.

An airbag device of a seventh aspect of the disclosure is the airbag device of the sixth aspect, wherein at least a part of the limiting member is contained in the projecting plate portion.

According to the airbag device of the sixth aspect or the seventh aspect, at least a part of the limiting member is contained in the projecting plate portion, the configuration of the portion of the limiting member that is secured to the door portion can be inhibited from becoming complex.

An airbag device of an eighth aspect of the disclosure is the airbag device of the fifth aspect, wherein one end portion of the limiting member is contained in the door portion, and another end portion, which is at an opposite side of the one end portion, of the limiting member is attached to the airbag housing.

According to the airbag device of the eighth aspect, securing of the limiting member to a vehicle body side can be flexibly performed.

The airbag device pertaining to the disclosure has the effect that it can inhibit displacement, inward in the vehicle width direction, of an airbag that has come into abutting contact with a curtain airbag.

BRIEF DESCRIPTION OF THE DRAWINGS

FIG. 7 is an enlarged view showing the part encircled by line 7 shown in FIG. 6.

DETAILED DESCRIPTION

Figure 1:
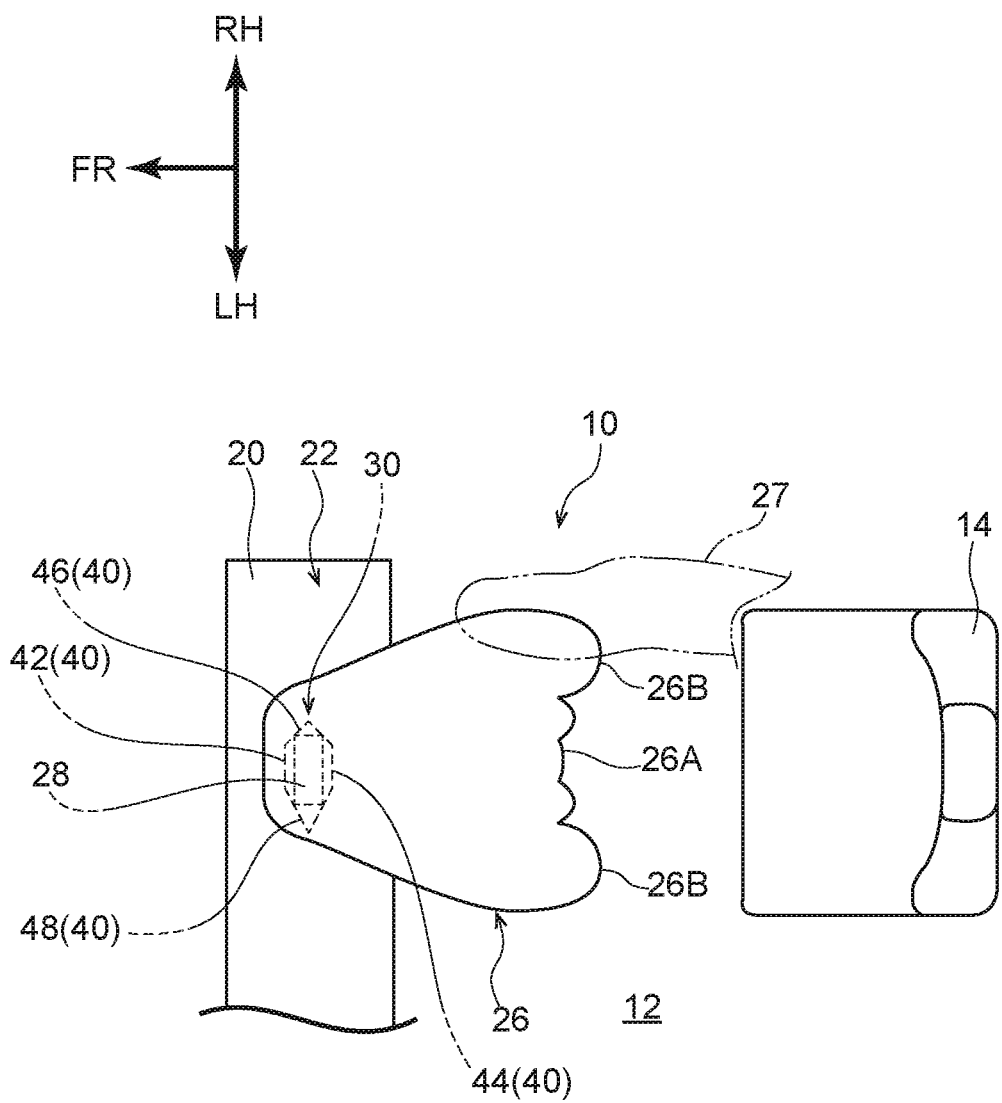
FIG. 1 is a plan view, seen from a vehicle upper side, schematically showing an airbag device of an embodiment of the disclosure.

An airbag device 10 pertaining to an embodiment of the disclosure will be described using FIG. 1 to FIG. 3. Arrow FR appropriately shown in the drawings indicates a forward direction in a vehicle front and rear direction, arrow UP indicates an upward direction in a vehicle up and down direction, arrow RH indicates a rightward direction in a vehicle width direction as seen from the perspective of a seated occupant, and arrow LH indicates a leftward direction in the vehicle width direction. Below, when description is given simply using the directions of front/rear, right/left, and upper/lower, unless otherwise specified these will be understood to mean front/rear in the vehicle front and rear direction, right/left in the vehicle right and left direction (the vehicle width direction), and upper/lower in the vehicle up and down direction.

As shown in FIG. 1, the airbag device 10 of the present embodiment is for restraining, at the time of an impact to the vehicle, an occupant seated in a front passenger seat 14 provided at a right side of a cabin 12. A driver's seat not shown in the drawings is provided at a left side of the front passenger seat 14 in the cabin 12.

The airbag device 10 includes a front airbag (a front passenger seat airbag) 26, which is deployed from a top plate portion 20 that forms an upper portion of an instrument panel 22 provided at a front side of the front passenger seat 14, and a curtain airbag 27, which is deployed from a vehicle width direction outer side (the right side) of the occupant seated in the front passenger seat 14.

The curtain airbag 27 is formed as a bag shape that is inflated by gas, which is generated by an inflator not shown in the drawings and is supplied to an inside of the curtain airbag 27. When the curtain airbag 27 is deployed, the curtain airbag 27 becomes disposed between the occupant seated in the front passenger seat 14 as well as an occupant seated at a right side of a rear seat and right side glasses not shown in the drawings.

The front airbag 26 is formed as a bag shape that is inflated by gas that is generated by a front passenger seat inflator (not shown in the drawings), which is provided independently of the inflator that inflates the curtain airbag 27, being supplied to an inside of the front airbag 26. The front airbag 26 includes a center portion 26A that is disposed opposing, in the front and rear direction, the occupant (the head of the occupant) and a right and left pair of projecting portions 26B that project rearward from a left-side end portion and a right-side end portion of the center portion 26A. In the present embodiment, the shape of the front airbag 26 after complete deployment is symmetrical in the vehicle width direction (the seat width direction). FIG. 2 shows a windshield 60.

Figure 3:
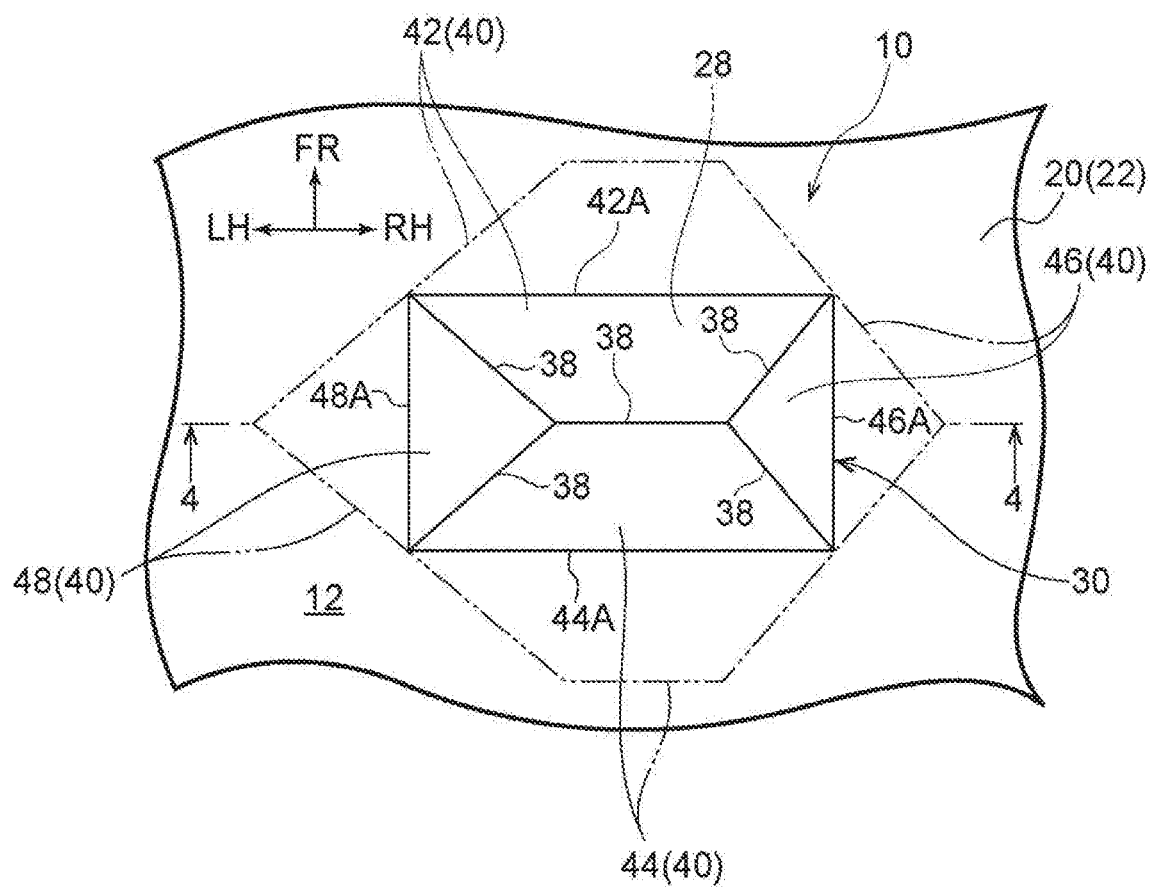
FIG. 3 is an enlarged plan view showing relevant portions of an airbag door.
Figure 4:
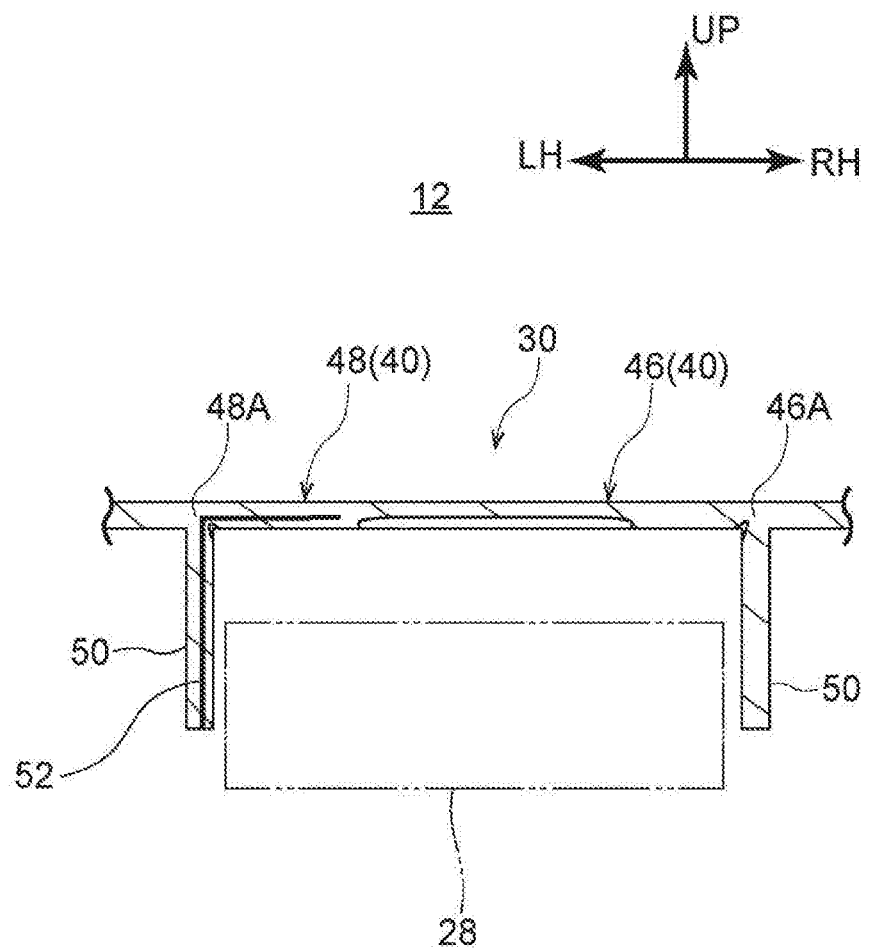
FIG. 4 is a sectional view showing a cross section of the airbag door cut along line 4-4 shown in FIG. 3.

As shown in FIG. 3 and FIG. 4, the front airbag 26 is housed in a folded-up state in an airbag housing (airbag case) 28 provided at a lower side of the top plate portion 20 of the instrument panel 22. An open end on a cabin 12 side of the airbag housing 28 is closed by an airbag door 30.

As shown in FIG. 3, the airbag door 30 is formed in the shape of a rectangular panel corresponding to the shape of the open end of the airbag housing 28. The airbag door 30 is configured to rupture at tear lines 38 which are grooves formed at a reverse surface of the airbag door 30 and at which the airbag door 30 is thinner-walled than at other common portions. When the airbag door 30 ruptures at the tear lines 38, the airbag door 30 becomes divided into four door portions 40. The four door portions 40 are displaced to be tilted toward the cabin 12 side as a result of being pushed by the inflated front airbag 26. In FIG. 3, the solid lines indicate a state before the airbag door 30 becomes divided into the four door portions 40 (a state before the airbag door 30 ruptures at the tear lines 38), and the double-short dashed lines indicate a state in which the four door portions 40 have been pushed by the inflated front airbag 26 and displaced to be tilted.

A front side part of the four door portions 40 is a front-side door portion 42 that tilts in the forward direction about a hinge portion 42A at a front-side edge of the open end of the airbag housing 28. The front-side door portion 42 is formed in the shape of a trapezoid whose bottom base is the hinge portion 42A.

A rear side part of the four door portions 40 is a rear-side door portion 44 that tilts in the rearward direction about a hinge portion 44A at a rear-side edge of the open end of the airbag housing 28. The rear-side door portion 44 is formed in the shape of a trapezoid whose bottom base is the hinge portion 44A. The front-side door portion 42 and the rear-side door portion 44 are configured to be symmetrical with respect to an imaginal line extended along a vehicle width direction.

A right side part of the four door portions 40 is a right-side door portion 46 that tilts in the rightward direction about a hinge portion 46A at a right-side edge of the open end of the airbag housing 28. The right-side door portion 46 is formed in the shape of an isosceles triangle whose base is the hinge portion 46A.

A left side part of the four door portions 40 is a left-side door portion 48 that tilts in the leftward direction about a hinge portion 48A at a left-side edge of the open end of the airbag housing 28. The left-side door portion 48 is formed in the shape of an isosceles triangle whose base is the hinge portion 48A. The hinge portions 42A, 44A, 46A, 48A are configured by grooves formed in the reverse surface of the airbag door 30, and the grooves are formed shallower than the grooves of the tear lines 38.

In the present embodiment, the tear lines 38 are set in such a way that the left-side door portion 48 is larger than the right-side door portion 46.

Furthermore, as shown in FIG. 4, the airbag door 30 includes a frame-shaped projecting plate portion 50 that projects downward from hinge portion 42A, 44A, 46A, 48A of the four door portions 40 and is disposed at an outer peripheral side of the airbag housing 28. Plural holes are formed at front and rear wall portions of the projecting plate portion 50, and plural hooks formed at the airbag housing 28 are engaged with the holes.

The airbag door 30 of the present embodiment is provided with a limiting member (an angle regulating member) 52 that limits leftward tilting of the left-side door portion 48 when the left-side door portion 48 has been pushed leftward by the front airbag 26.

The limiting member 52 is, for example, formed using a cord or nylon net whose amount of deformation with respect to tension is small. In the present embodiment, the limiting member 52 is secured to the airbag door 30 by being contained (inserted) inside from the left-side door portion 48 to the projecting plate portion 50. Furthermore, the limiting member 52 is offset toward an airbag housing 28 side with respect to a thickness centers of the left-side door portion 48 and the projecting plate portion 50. When the left-side door portion 48 becomes tilted leftward, the tension of the limiting member 52 increases, whereby leftward tilting of the left-side door portion 48 is restricted.

(Action and Effects of Present Embodiment)

Next, the action and effects of the present embodiment will be described.

As shown in FIG. 1, when the vehicle including the airbag device 10 of the present embodiment sustains a frontal impact, predetermined inflators generate gas. "Frontal impact" refers to a full overlap impact, an offset impact, a small overlap impact, or an oblique impact.

The gas generated by the inflator for the curtain airbag is supplied to the inside of the curtain airbag 27. The curtain airbag 27 inflates and becomes deployed between the occupant seated in the front passenger seat 14 and the right-side glass not shown in the drawings.

Figure 5:
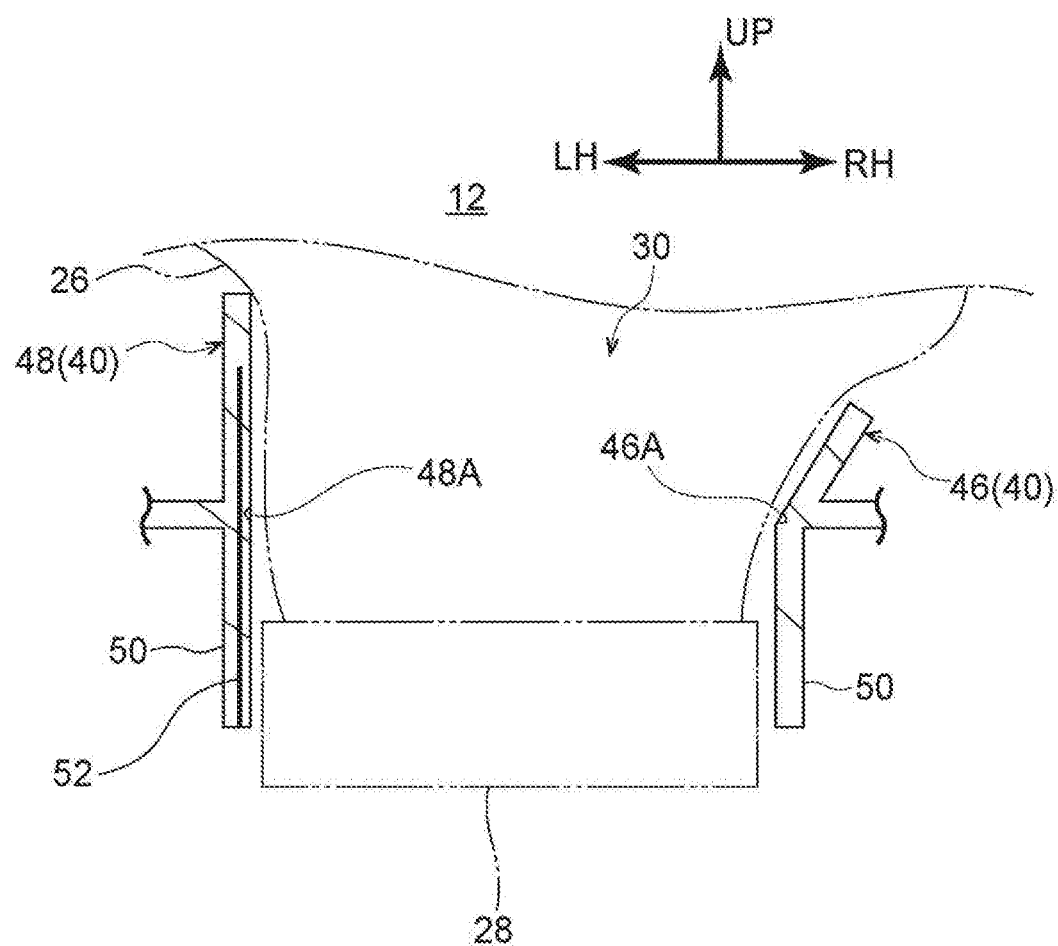
FIG. 5 is a sectional view showing a cross section of the airbag door when a front airbag has deployed to a cabin.

Furthermore, as shown in FIG. 1, FIG. 3, and FIG. 4, the gas generated by the inflator for the front passenger seat airbag is supplied to the inside of the front airbag 26 housed in a folded-up state in the airbag housing 28. The front airbag 26 starts to inflate, and the front airbag 26 pushes the airbag door 30 toward the cabin 12 side. As a result, the airbag door 30 ruptures at the tear lines 38, and, as shown in FIG. 1, FIG. 3, and FIG. 5, the front-side door portion 42, the rear-side door portion 44, the right-side door portion 46, and the left-side door portion 48 that configure the airbag door 30 tilt about their respective hinge portions 42A, 44A, 46A, 48A. The cabin 12 side of the airbag housing 28 is opened and the front airbag 26 deploys from the airbag housing 28 to the vehicle front side of the occupant seated in the front passenger seat 14.

As shown in FIG. 1, in a configuration where the front airbag 26 and the curtain airbag 27 become deployed respectively on the front side and the vehicle width direction outer side of the front passenger seat 14, it is conceivable for the curtain airbag 27 and the front airbag 26 to come into abutting contact with each other and for the front airbag 26 to be displaced inward in the vehicle width direction. However, in the present embodiment, as shown in FIG. 5, displacement of the front airbag 26 inward in the vehicle width direction can be regulated by the left-side door portion 48 whose leftward tilting is restricted by the limiting member 52. Displacement, inward in the vehicle width direction, of the front airbag 26 that has come into abutting contact with the curtain airbag 27 can be inhibited. Furthermore, since the left-side door portion 48 is larger than the right-side door portion 46, displacement, inward in the vehicle width direction, of the front airbag 26 can be effectively inhibited by the left-side door portion 48.

Figure 2:
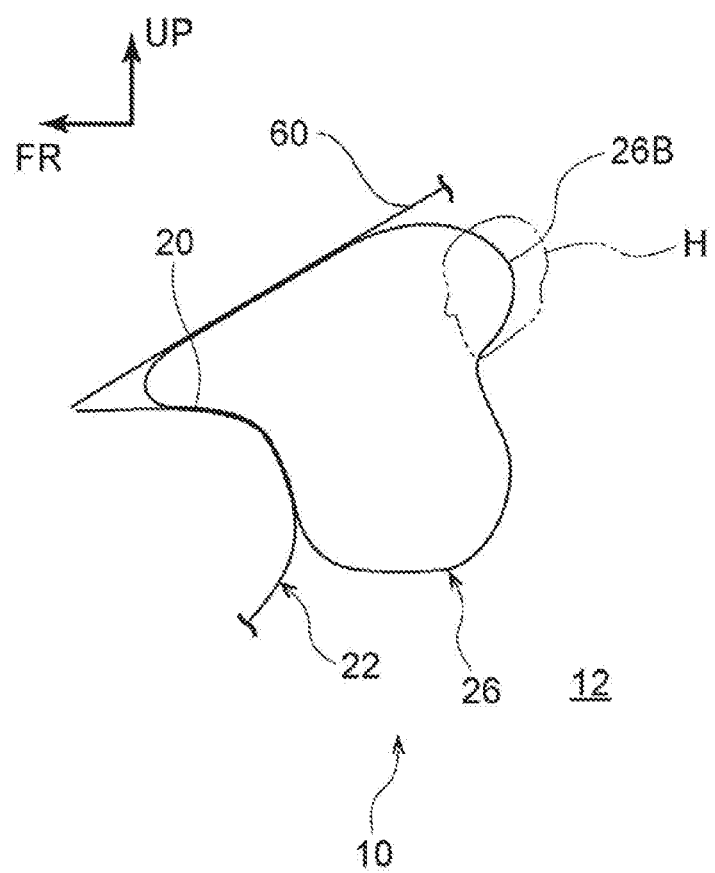
FIG. 2 is a side view, seen from a vehicle left side, schematically showing the airbag device of the embodiment.

Furthermore, in the present embodiment, the front airbag 26 includes the right and left pair of projecting portions 26B, as shown in FIG. 2, the head H of the occupant that moves obliquely forward at the time of a frontal impact to the vehicle can be restrained by the projecting portions 26B. At the same time, in a configuration where the front airbag 26 includes the right and left pair of projecting portions 26B, it is easy for the projecting portion 26B on the vehicle width direction outer side to come into abutting contact with the curtain airbag 27. However, in the present embodiment, when the projecting portion 26B on the vehicle width direction outer side comes into abutting contact with the curtain airbag 27, displacement of the front airbag 26 inward in the vehicle width direction can be regulated by the left-side door portion 48 whose leftward tilting is restricted by the limiting member 52.

In this connection, in a configuration that does not have the projecting portion 26B on the vehicle width direction outer side so as to avoid abutment with the curtain airbag 27, that is, in a configuration where the front airbag 26 is not symmetrical in the vehicle width direction, it is easy for the front airbag 26 to swing in the vehicle width direction when the front airbag 26 inflates. However, in the present embodiment, the front airbag 26 is symmetrical in the vehicle width direction, the front airbag 26 can be inhibited from swinging in the vehicle width direction when the front airbag 26 inflates. In this way, because displacement, inward in the vehicle width direction, of the front airbag 26 that has come into abutting contact with the curtain airbag 27 is inhibited and the front airbag 26 is inhibited from swinging in the vehicle width direction when the front airbag 26 inflates, the head H of the occupant that moves obliquely forward at the time of a frontal impact to the vehicle can be more reliably restrained by the projecting portions 26B. As a result, the rotational injury criterion of the head H of the occupant can be more reliably reduced.

Furthermore, in the present embodiment, the limiting member 52 is secured to the airbag door 30 as a result of being contained (inserted) inside from the left-side door portion 48 to the projecting plate portion 50. The configuration that secures the limiting member 52 to the airbag door 30 can be inhibited from becoming complex.

Figure 6:
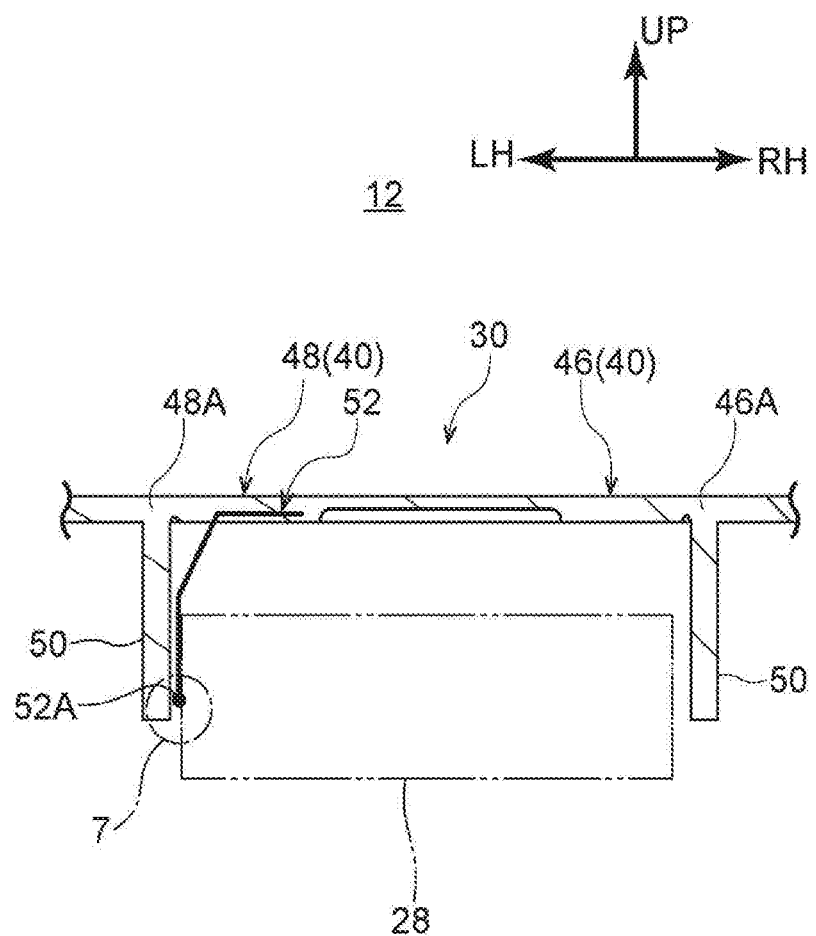
FIG. 6 is a sectional view, corresponding to FIG. 4, showing a cross section of the airbag door of another embodiment.

Although in the present embodiment an example is described where the entire limiting member 52 is contained (inserted) inside from the left-side door portion 48 to the projecting plate portion 50, the disclosure is not limited to this. For example, as shown in FIG. 6 and FIG. 7, a part of the limiting member 52 may also be inserted inside the left-side door portion 48, and a hole formed at an end portion 52A, which is at an opposite side of the side inserted inside the left-side door portion 48, of the limiting member 52, may be made to engage with the airbag housing 28. In the example shown in FIG. 7, a cut-and-raised piece portion 54 that has been cut and raised toward an outside of the airbag housing 28 (the opposite side of the side where the front airbag 26 is housed) is formed at the outer peripheral portion of the airbag housing 28. The end portion 52A of the limiting member 52 is engaged with the cut-and-raised piece portion 54. Furthermore, since the cut-and-raised piece portion 54 is cut and raised (projects) toward the outside of the airbag housing 28, the cut-and-raised piece portion 54 can be prevented from catching on the front airbag 26.

Moreover, in the present embodiment, an example was described where the shape of the front airbag 26 after complete deployment is configured to be symmetrical in the seat width direction, but the disclosure is not limited to this. It suffices to appropriately set the shape of the front airbag 26 after deployment in consideration of the trajectory of movement of the body of the occupant at the time of an impact to the vehicle. Furthermore, in the same way it suffices to appropriately set whether or not to provide the projecting portions 26B in the front airbag 26.

Furthermore, in the present embodiment, an example was described where the left-side door portion 48 is larger than the right-side door portion 46, but the disclosure is not limited to this. Whether or not the left-side door portion 48 is larger than the right-side door portion 46 may be appropriately set in consideration of, for example, the contact pressure between the front airbag 26 and the left-side door portion 48.

An embodiment of the disclosure has been described above, but the disclosure is not limited to what is described above and can of course be modified and implemented in a variety of ways, in addition to what is described above, in a range that does not depart from the scope of the disclosure.

What is claimed is:

1. An airbag device comprising:
   a curtain airbag that is inflated by gas supplied to an inside of the curtain airbag, and that is configured to be deployed to a vehicle width direction outer side of an occupant seated in a vehicle seat;
   a front airbag provided at a vehicle front side of the vehicle seat, which is inflated by gas supplied to an inside of the front airbag, and which is configured to be deployed to a vehicle front side of the occupant seated in the vehicle seat;
   an airbag housing, provided at the vehicle front side of the vehicle seat, in which the front airbag is housed before inflating; and
   an airbag door that covers the airbag housing from a cabin side and that is displaced toward a cabin side, in a case in which the front airbag inflates such that the cabin side of the airbag housing is opened, wherein:
   the airbag door includes plural door portions that tilt about hinge portions disposed at an airbag housing side, and
   the airbag device is provided with a limiting member that restricts tilting of a door portion that tilts about a hinge portion that is disposed at a vehicle width direction inner side of the airbag housing,
   wherein the limiting member is a cord.

2. The airbag device according to claim 1, wherein a size of the door portion whose tilting is restricted by the limiting member is larger than a size of a door portion that tilts about a hinge portion that is disposed at a vehicle width direction outer side of the airbag housing.

3. The airbag device according to claim 1, wherein the front airbag comprises:
   a center portion disposed opposing, in a seat front and rear direction, the occupant seated in the vehicle seat, and
   projecting portions projecting in a seat rearward direction from both end portions in the vehicle width direction of the center portion.

4. The airbag device according to claim 1, wherein the front airbag is symmetrical in the vehicle width direction.

5. The airbag device according to claim 1, wherein at least a part of the limiting member is contained in the door portion.

6. The airbag device according to claim 1, wherein the airbag door includes a frame-shaped projecting plate portion that projects to the airbag housing side from the hinge portions of the door portions, and the projecting plate portion is disposed at an outer peripheral side of the airbag housing.

7. The airbag device according to claim 6, wherein at least a part of the limiting member is contained in the projecting plate portion.

8. The airbag device according to claim 5, wherein one end portion of the limiting member is contained in the door portion, and another end portion, which is at an opposite side of the one end portion, of the limiting member is attached to the airbag housing.

* * * * *